US012055846B2

United States Patent
Zhu et al.

(10) Patent No.: US 12,055,846 B2
(45) Date of Patent: Aug. 6, 2024

(54) SPONTANEOUS POP-UP DISPLAY DEVICE WITH ATTACHED SCREEN

(71) Applicant: Arovia, Inc., Macungie, PA (US)

(72) Inventors: Shengliang Zhu, Houston, TX (US); Alexander David Wesley, Macungie, PA (US); Leonard Wong, Hong Kong (HK)

(73) Assignee: Arovia, Inc., Houston, TX (US)

( * ) Notice: Subject to any disclaimer, the term of this patent is extended or adjusted under 35 U.S.C. 154(b) by 70 days.

(21) Appl. No.: 17/869,654

(22) Filed: Jul. 20, 2022

(65) Prior Publication Data

US 2023/0039016 A1    Feb. 9, 2023

Related U.S. Application Data

(63) Continuation of application No. 16/961,253, filed as application No. PCT/US2019/013158 on Jan. 11, 2019, now abandoned.

(60) Provisional application No. 62/615,968, filed on Jan. 11, 2018.

(51) Int. Cl.
*G03B 21/58* (2014.01)
*G03B 21/10* (2006.01)

(52) U.S. Cl.
CPC .............. *G03B 21/58* (2013.01); *G03B 21/10* (2013.01)

(58) Field of Classification Search
CPC ................................ G03B 21/58; G03B 21/10
See application file for complete search history.

(56) References Cited

U.S. PATENT DOCUMENTS

| 3,510,197 | A | 5/1970 | Hajime | G03B 21/602 |
| | | | | 359/461 |
| 5,337,179 | A | 8/1994 | Hodges | B29D 11/0073 |
| | | | | 359/443 |
| 6,144,491 | A | 11/2000 | Orikasa | G03B 21/60 |
| | | | | 359/452 |
| 2007/0035827 | A1 | 2/2007 | Shimoda | G03B 21/602 |
| | | | | 359/449 |
| 2010/0053746 | A1 * | 3/2010 | Seymour | G03B 21/58 |
| | | | | 359/443 |

(Continued)

FOREIGN PATENT DOCUMENTS

| JP | 2008070749 A | * | 3/2008 | |
| WO | WO-2016154481 A1 | * | 9/2016 | G03B 21/10 |
| WO | WO2017/070435 | * | 4/2017 | G03B 21/10 |

*Primary Examiner* — Christopher E Mahoney
(74) *Attorney, Agent, or Firm* — Cecil A. McClure

(57) ABSTRACT

The present disclosure provides an improved collapsible portable, display device. The improved collapsible, portable display device, has a housing member having a sliding member aligned on the exterior of the housing member and sliding along the exterior of said housing member between two operating positions, a collapsible screen containing one or more sheets of flexible, wrinkle resistant silicone or rubber materials containing optical enhancing components and capable of displaying an image when in an expanded operating position, and multiple collapsible members connected to said screen and connected to said sliding member and said housing member, and the collapsible members move said screen between the collapsed and expanded operating positions as said sliding member moves between a first position and a second position.

21 Claims, 16 Drawing Sheets

(56) References Cited

U.S. PATENT DOCUMENTS

| | | | |
|---|---|---|---|
| 2011/0261450 A1* | 10/2011 | Howes | G03B 21/56 359/443 |
| 2013/0027771 A1 | 1/2013 | Aoki | G03B 21/58 359/461 |
| 2016/0004150 A1 | 1/2016 | Su | G03B 21/60 359/452 |

* cited by examiner

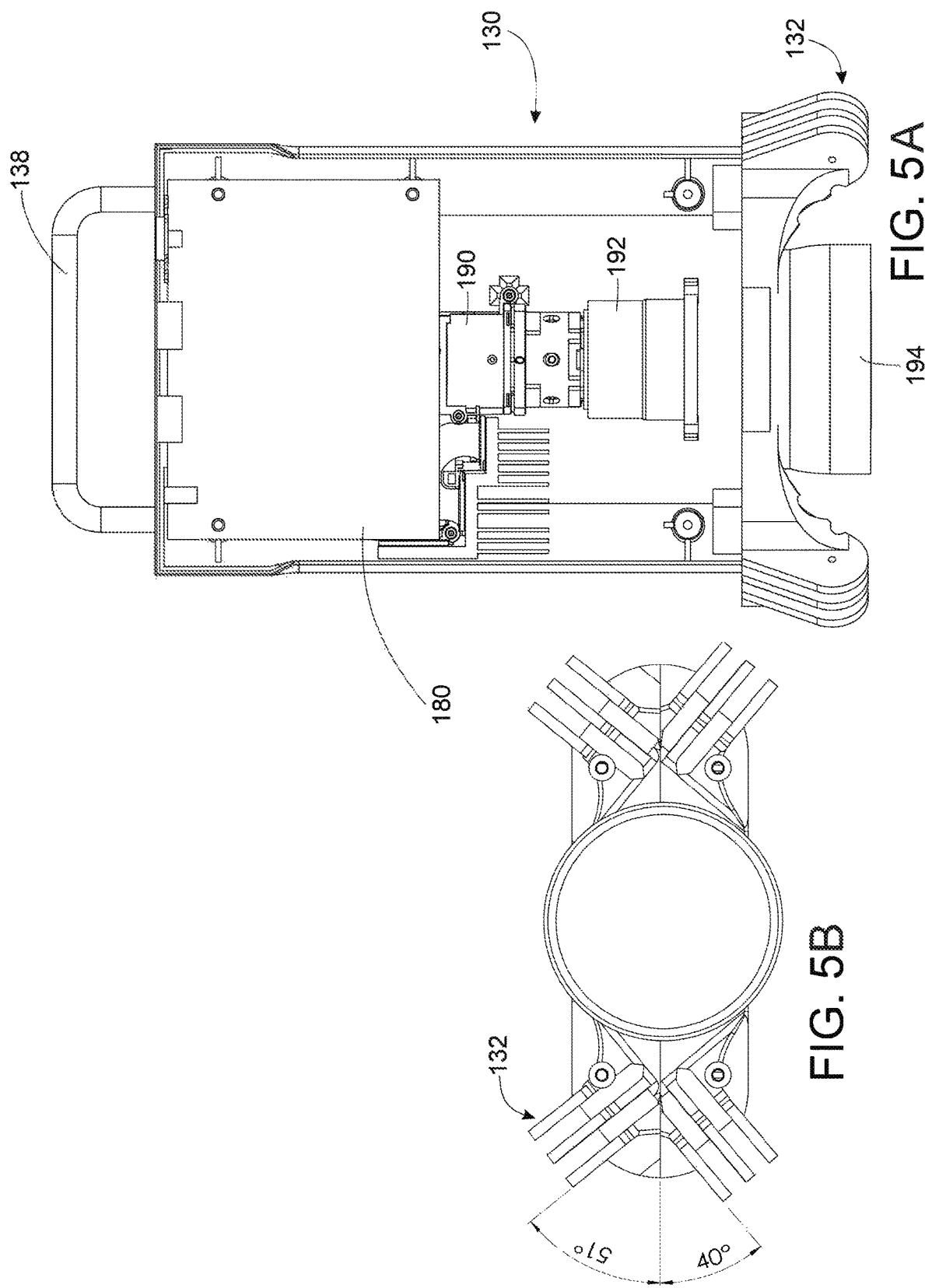

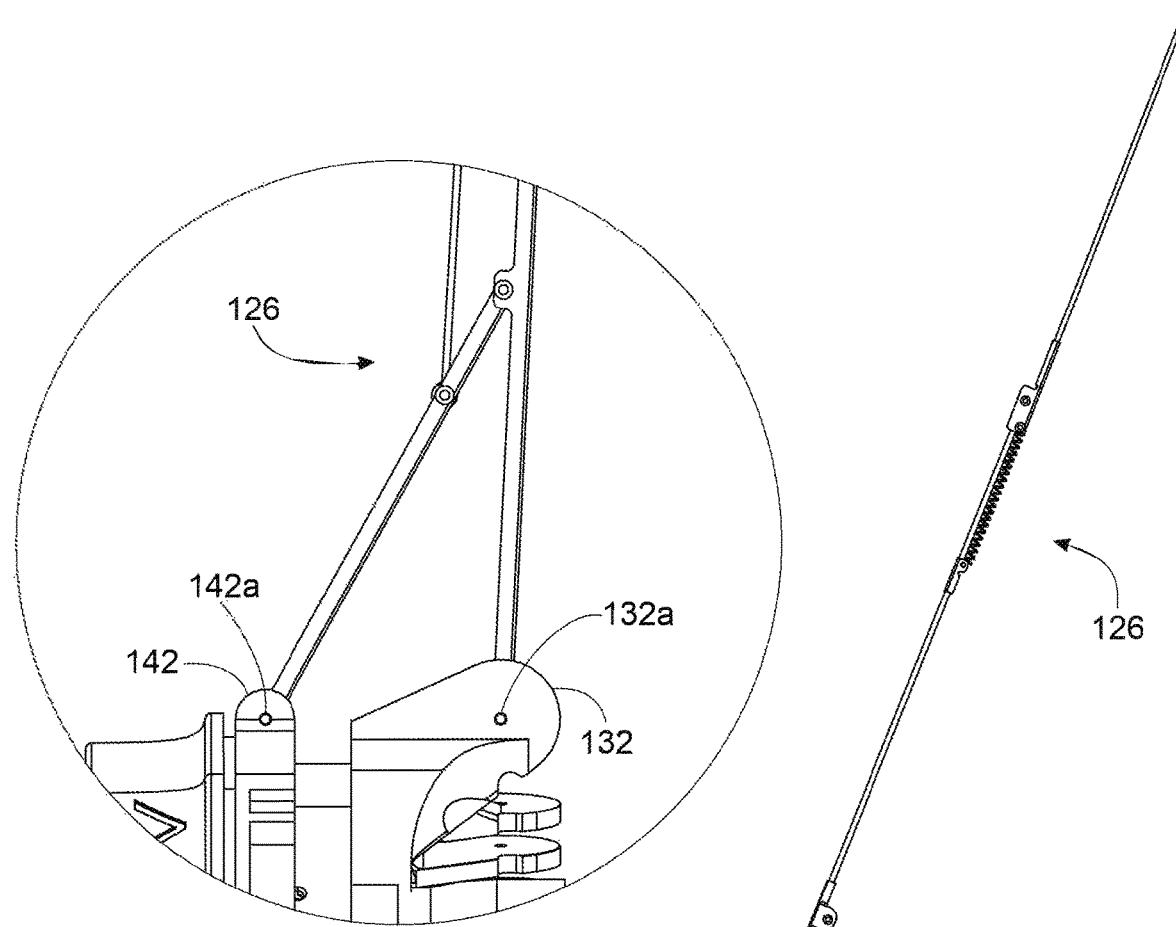
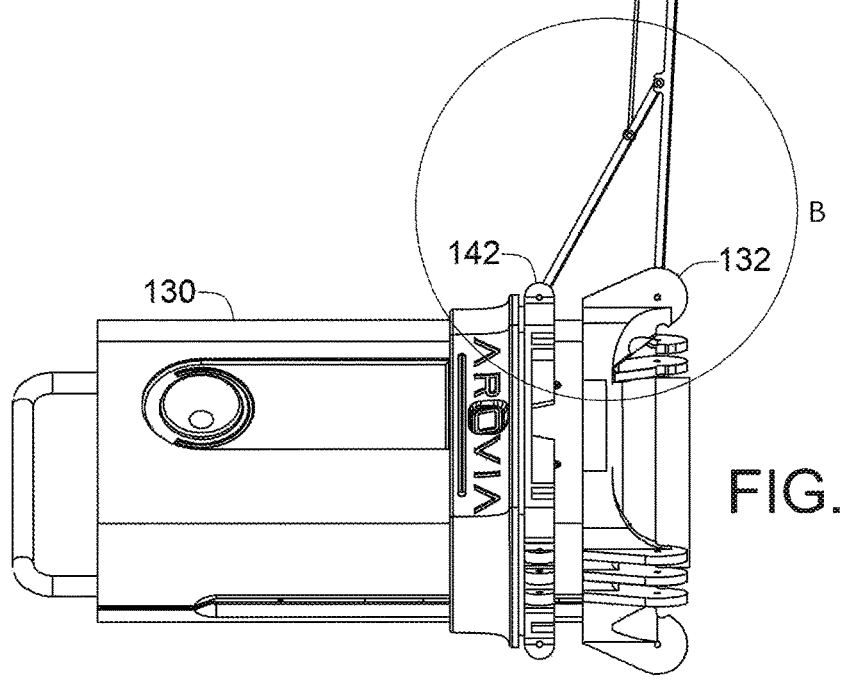
FIG. 7B
FIG. 7A

SPONTANEOUS POP-UP DISPLAY DEVICE WITH ATTACHED SCREEN

CROSS REFERENCE TO RELATED APPLICATIONS

This Application is a Continuation of U.S. patent application Ser. No. 16/961,253 filed on Jul. 10, 2020, which claims the benefit of U.S. Provisional Application No. 62/615,968 which was filed on Jan. 11, 2018, the disclosure of which is incorporated herein by reference in its entirety.

TECHNICAL FIELD OF THE DISCLOSURE

This disclosure relates to portable, collapsible display devices.

BACKGROUND OF THE DISCLOSURE

Displays have been used in multiple sizes and configurations in conference rooms, homes, hotels, offices, and other locations for showing information. Such displays may be portable or built into a room, like a conference room. In addition, projection televisions and other projectors are used for larger audiences. There are also small projector systems that are available for displaying information.

SUMMARY OF THE DISCLOSURE

The present disclosure is a collapsible display device, where the device can be stored in a compact portable form and pop-up to provide a large screen when in use. The device may optionally include a built in projector with improved screen and shroud materials, and deployment features. The SPUD (Spontaneous Pop-Up Display) disclosure has multiple embodiments. The present disclosure is related to improvements that facilitate manufacturing and bolster performance.

These and other features of the disclosure will become apparent to those skilled in the art from the following detailed description of the disclosure, taken together with the accompanying drawings.

BRIEF DESCRIPTION OF THE DRAWINGS

FIG. 5 A depicts a top partially, cut away view of the internal components of the main body of FIG. 4, and FIG. 5 B depicts a front view of the arm attachments to the main body.

FIGS. 7 A and B depict the improved attachment of one of the folding arms of a prototype to the main body and sliding member of one embodiment of the present disclosure.

DETAILED DESCRIPTION

Figure 1:
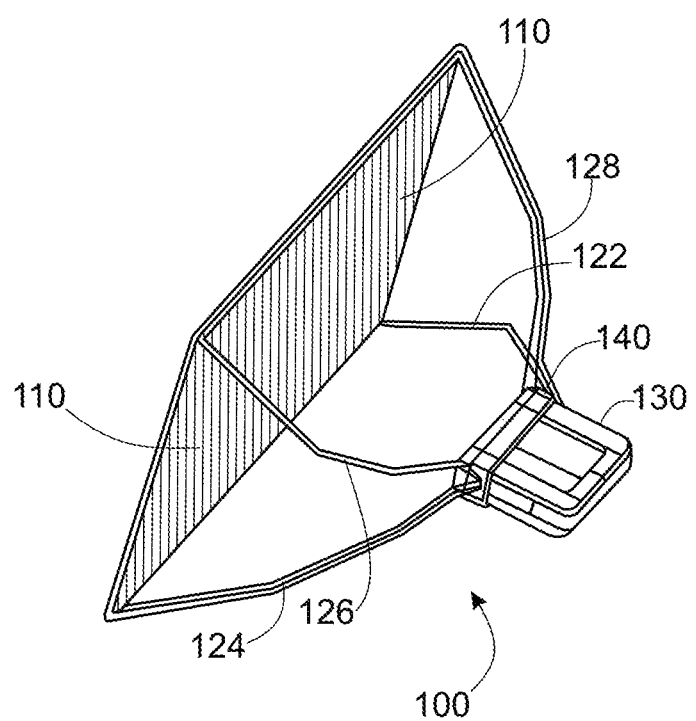
FIG. 1 depicts one embodiment of the collapsible, portable display of the present disclosure.
Figure 2:
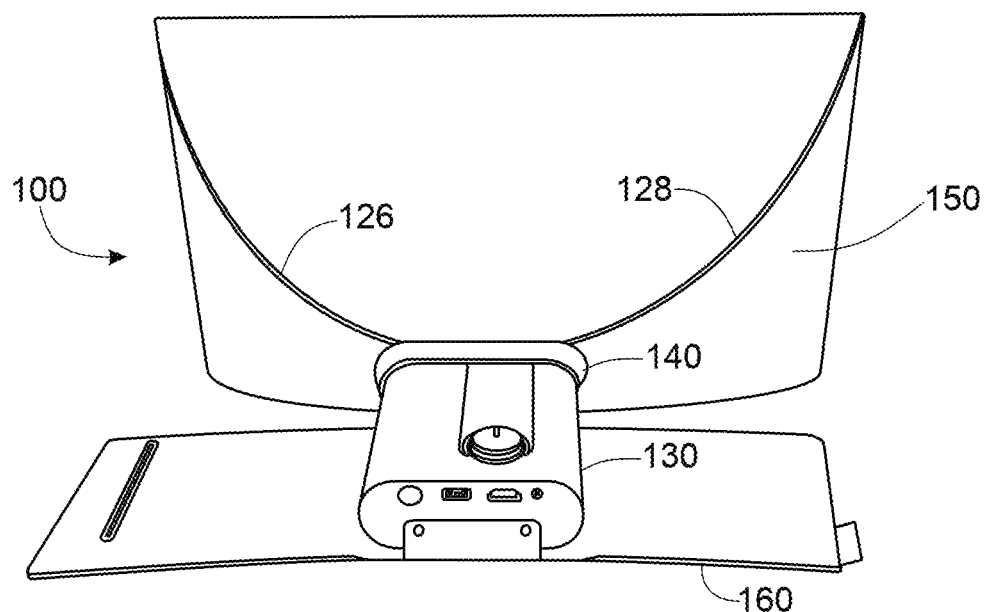
FIG. 2 depicts a rear view of the general arrangement of one embodiment of the collapsible, portable display of the present disclosure.

The present disclosure is an improved Spontaneous Pop-Up Display (SPUD) device. The SPUD is a collapsible display device, where the device can be stored in a compact portable form and then pops-up to provide a large screen when in use. FIGS. 1 and 2 depict embodiments 100 of the collapsible, portable display of the present disclosure.

Referring now to FIG. 1, there may be seen one embodiment of the collapsible, portable display 100 of the present disclosure in a popped-up or fully extended operating position. More particularly, it may be seen that this embodiment 100 has a fully extended, or popped-up, display screen 110 and four collapsible arms 122, 124, 126, 128 attached at the corners of the screen and that each of the arms are also attached to a corresponding location on a main body portion 130. Each arm has two attachment points on the body. One rotatable attachment of each arm is connected to a fixed non-moving portion of the body 130, and the other rotatable attachment of each arm is connected to a moveable sliding member 140 disposed on or around the main body or housing that is described in more detail later herein. Note that each arm has two joints that allow for collapsing the arms and the screen as described in more detail later herein. However, each arm may have more than two joints or fewer than two joints. Further, the two upper arms may be slightly longer than the two lower arms to compensate for the weight of the screen and the shroud.

Referring now to FIG. 2, there may be seen a rear perspective view of the general arrangement of one embodiment of the collapsible, portable display device when in the popped-up or fully extended operating position. More particularly, it may be seen that this embodiment 100 has a fully extended popped-up display screen (not visible in this view, but see FIG. 1) and four collapsible arms (two of which are labelled as 126, 128, and are not visible but may be seen in FIG. 1) attached at the corners of the screen and that each of the arms are also attached to corresponding locations on a main body portion 130.

Figure 17:
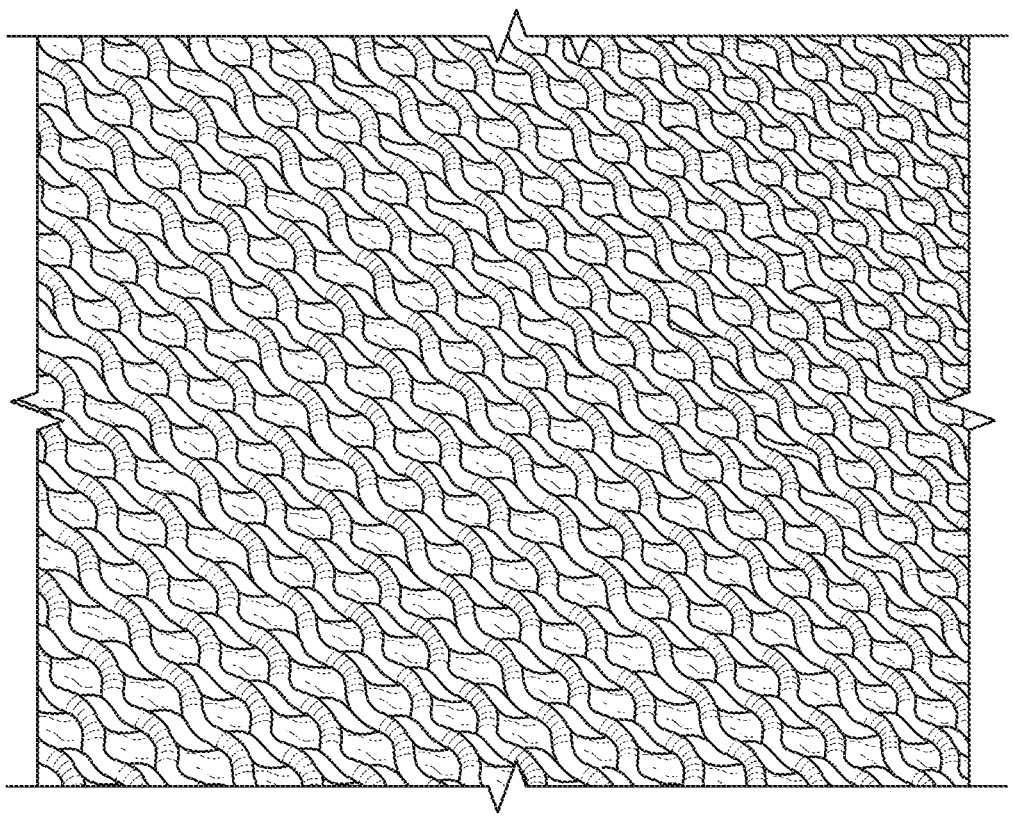
FIG. 17 depicts a fabric with textured patterns used to mitigate wrinkles.

There may also be seen a shroud 150. The shroud 150 encloses the collapsible folding arms, the screen, and the whole trapezoidal volume spanned by the four folding arms attached to four corners of the screen. Any embodiment using a shroud 150 requires the collapsible, portable display to be a rear projection device because the back is covered by the shroud. The shroud 150 is made of polyester fabric, any other suitable fabric, or flexible and soft material, and it is preferably of some dark color to absorb ambient light. Referring to FIG. 17, the fabric of the shroud preferably has various kinds of textured patterns on its surface, like, for example, but not limited to indented patterns, slanted bump patterns or hexagonal patterns and is wrinkle resistant. These patterns can improve fabric wrinkle resistance and also help mitigate ambient light outside from the environment, and mitigate stray projection light reflected off the shroud, from inside the shroud. The shroud blocks external light to improve the contrast of the image on the screen, stops dust from getting inside any optical system of a projector that may be located in the body 130, and prevents passersby from seeing the screen from the back side.

Each collapsible arm may have two rotatable attachment points to the body 130. A first rotatable attachment of each arm is to a fixed non-moving portion of the body 130. A second rotatable attachment of each arm is to a moveable sliding member 140 disposed on or around the main body 130 (or housing) that is described in more detail later herein. For this prototype embodiment each collapsible arm has two joints that allow for collapsing the arms and the screen as described in more detail later herein. However, as noted earlier herein, each arm may have more than two joints or fewer than two joints. Also depicted is a protective cover 160 that is used to enclose the entire display device when in the fully collapsed position. The cover 160 may use Velcro, straps, snap buttons, or any other type of fixtures to remain closed.

Figure 3:
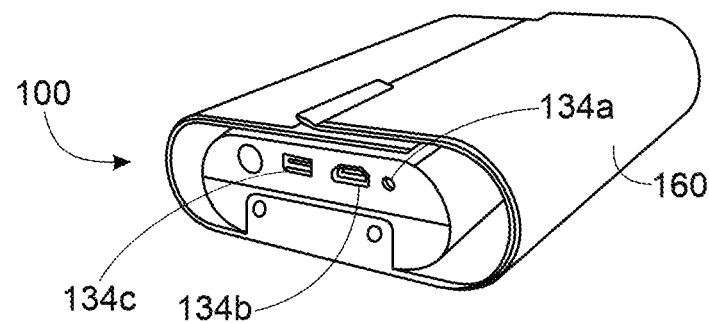
FIG. 3 depicts a rear view of the embodiment of the collapsible, portable display of the present disclosure of FIG. 2 in the fully collapsed position.

Referring now to FIG. 3, there may be seen a rear view of the collapsible, portable display 100 of the present disclosure of FIG. 2 in the fully collapsed position. More particularly, it may be seen that this embodiment 100 has a protective cover 160 fully enclosing the display device of which the main body 130 may be seen. Openings for electrical connections for providing power 134a and an HDMI electronic signal 134b representing the image to be displayed and a USB port 134c may also be seen.

Continuing to refer to FIG. 1, sliding member 140 is disposed on the exterior of the housing 130 and is used to push the two ends of the folding collapsible arms 122, 124, 126, 128, rotatably connected to the main body 130, toward each other and cause the arms to fully extend to position the screen in the operating popped-up position. A first end of each folding collapsible arm is connected to the housing 130 via a rotatable axis that is fixed. A second end of each folding collapsible arm is connected to a rotatable axis on the sliding member 140. When the device 100 is initially in a closed up position, the sliding member 140 is located at the back of the device main housing 130 near the handle 138 (FIG. 4). To pop-up the folding collapsible arms, the sliding member 140 is pushed forward. The sliding member 140 may be constructed to be self-latching (so as to not slide back) automatically when the arms are fully extended; this may be accomplished by a simple spring loaded mechanical latch assembly. Other embodiments may employ a spring (or other mechanical energy storage device) to move sliding member 140 forward to pop-up screen 110. For these embodiments a separate latch mechanism is used to keep the device stored and is pushed or activated and released to allow the sliding member 140 to slide forward and pop-up the screen 110.

The screen 110 is appropriately tensioned using the extended folding collapsible arms 122, 124, 126, 128 that are connected to and support the screen in its extended display position. Further, the two upper arms may be slightly longer than the two lower arms to compensate for the weight of the screen and the shroud. The folding collapsible arms are similar to umbrella arms; although other embodiments may employ different arm arrangements or configurations that are collapsible. They unfold, extend out, and tension the screen 110 when the ends of the arms connected to the housing 130 and the moveable member 140 are pushed towards each other by moving the sliding member 140 forward on the housing 130. The other end of each of the folding arms 122, 124, 126, 128 is connected to the corners or edges of the screen 110 in a removable manner and provide the force to tension the screen; when properly tensioned, the screen has concave edges. Preferably, and as described later herein with respect to FIG. 13C, each corner of the screen includes a metal clamp that clamps onto the screen material without damaging or penetrating the screen material. In addition, a thin layer of polyurethane or similar soft/cushion material may be inserted between the clip gripping closure edges to further ensure no damage to the screen material (as depicted in FIG. 13C). Depending on how tensioned the screen is desired to be, additional collapsible folding arms can be added to the four corners or other edges of the screen using these clamps to further stretch the screen 110. As noted later herein, two such arms may be joined together to provide the required rigidity, stiffness and strength for an arm member. Alternatively, the arm member may be constructed from a lightweight but strong steel or other similar high strength materials such as carbon fiber and glass fiber. The arm members may also be made partially or entirely out of flexible and strong plastic materials such as Polyoxymethylene (POM). The arm needs to provide rigidity and strength without causing excessive weight.

For rear projection, the image location on the screen output by the projector may not be consistent due to variances in mechanical tolerances. For a typical projector on the market, an offset variation of about 1 inch on each side of a 24-inch diagonal rectangular image from projector to projector may occur. In order to center the projected image on the screen 110, an adjustable mechanism may be introduced to the arms, the sliding member, or the housing of the arms, so that the location on the screen may be adjusted to be centered. For instance, in FIG. 7B adjustment screws may be incorporated into the mounting extension 142 of the sliding member, so that the mounting extension location may be adjusted slightly relative to the sliding member, thereby moving the entire arm attached to that specific mounting extension relative to the other arms. By moving one arm relative to the other 3 arms, the location of the screen may be slightly adjusted to accommodate projected image shift. This is analogous to changing the leg lengths of a table to achieve different heights. Similarly, adjustment mechanisms like the adjustment screws may be introduced to the mounting extension on the housing to achieve the same effect. The adjustment mechanism may also be introduced into the joint s or members of the arms to directly adjust the length and angle of each individual arm.

In some cases, the arms may be susceptible to external vibrations when the device is in its popped up operating state. Such vibrations may affect the stability of the screen, thereby affecting the user-experience when viewing. To reduce the vibration frequency, amplitude dampening material may be added to the attachment points between the arms and a table top, or between the housing and the table top.

Screen 110 may also have a foldable frame element that may be attached around its outer edge (not depicted) in a removable manner. The frame supports and provides tension to the screen to create a smooth projection surface. The frame can also easily collapse into a small size.

For rear projection, the material of the screen 110 is usually vinyl or silicone based translucent materials, although other similar elastic or flexible materials may be employed as a screen material. For the presently preferred silicone screens, small titanium dioxide particles may be impregnated into the screen material for better luminance homogeneity. These particles preferably have an index of refraction different from, and preferably higher than, that of the actual screen material. Although other metals, compounds, or similar particles with an index of refraction different from the screen material may be employed to improve image quality, the presently preferred small titanium dioxide particles are generally less than 10 microns in size. These particles may be added to the screen material in an organized and aligned pattern to improve image quality further by achieving certain desired effects, such as transmitting more light from one direction while absorbing more from another direction.

In addition to the particles to improve homogeneity, other substances such as particles with different colors, a colored paste, and a dye may be added to the screen material. These substances will further improve screen quality. For example, colored particles may be used to make the screen grey to achieve a higher contrast for projected images.

Figure 15:
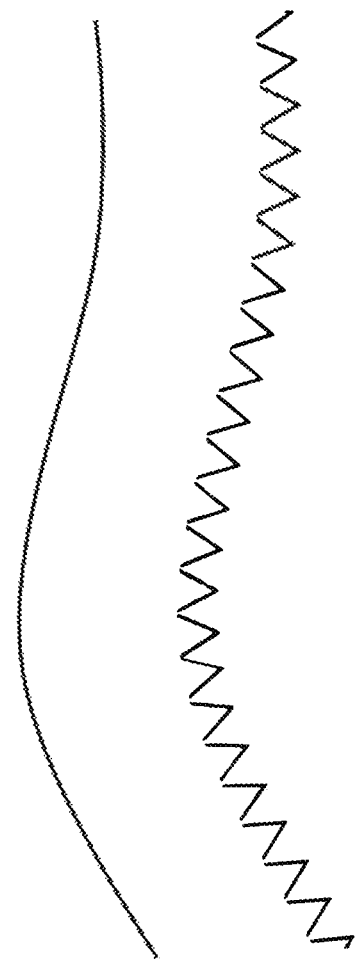
FIG. 15 depicts a flexible portable, collapsible screen composed of an elastic or flexible material with surface modifications that includes samples of optical enhancing components, like fresnel lens(es) and/or microstructures that reflect or absorb unwanted ambient light.
Figure 16:
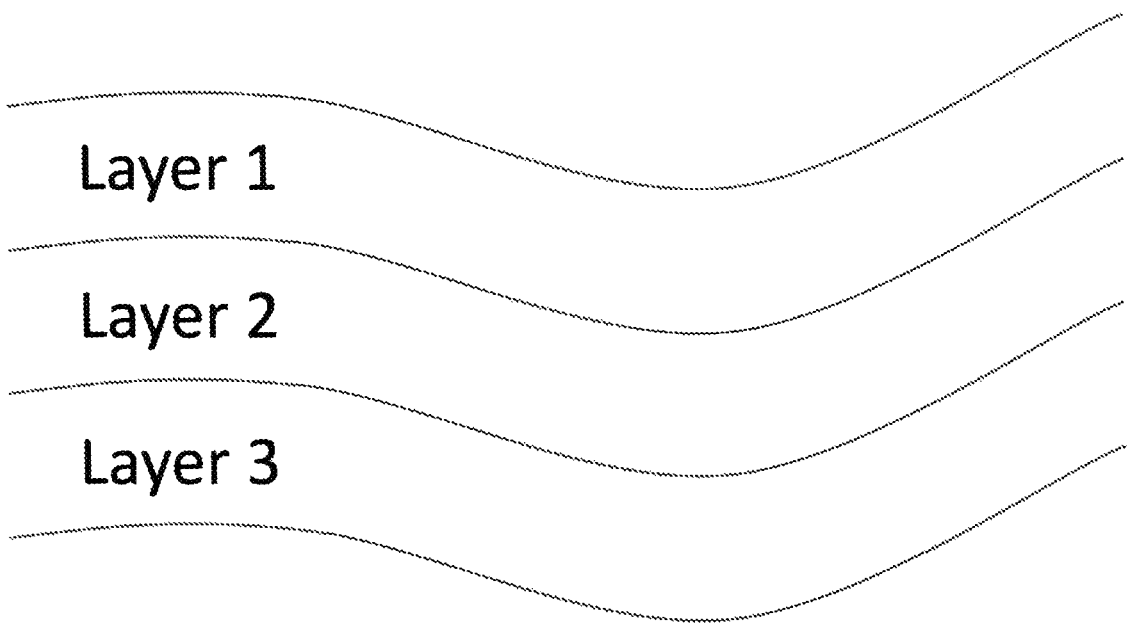
FIG. 16 depicts a flexible portable, collapsible screen composed of an elastic or flexible material with multiple layers, wherein such layers may include, polarizers, fresnel lenses, and strengthening material.

As shown in FIG. 15, other features may be added to the screen material in addition to or in place of the embedded particles; such features may be for example, but not limited to, Fresnel lens(es), micro-lenses or other micro-structures that absorb or reflect light coming from the top or outside (sun light and/or room light). Examples of such microstructures are those commercially available from Innovision FlexTech Corporation (Nexy Film) located in Taiwan. Further, as shown in FIG. 16, the screen may be made up of several different layers. Each layer can be rubber or silicone rubber to improve the wrinkle resistance property, or can be materials with different optical features, such as, but not limited to, a layer made out of plastic substrate containing optical enhancing component(s) (glass or plastic microlenses, and micro-structures, etc), a layer made out of rubber substrate containing compound light dispersing particles or coatings, or a layer with other optical processing materials or optical enhancing components. The use of these various optical enhancing components in the screen materials improves the image clarity and quality for better viewing.

These presently preferred screen materials diffuse the light coming from a projector, resist wrinkles when stored folded, and are stretchable to a tensioned state. The screen is also dust-resistant, may be removable and easily cleaned with soap, and durable. For front projection, the material of the screen would no longer be translucent but reflective.

Some of the screen material selections may be prone to tearing caused by existing cuts and holes, such as silicone rubber material, of which cuts can propagate easily. To prevent a tear or cut from propagating on a single sheet of silicone rubber material, one may stick another layer of silicone rubber onto the existing cut, using Room-Temperature-Vulcanizing silicone (RTV) as the gluing agent, or any other applicable glue. An example of the method on the current invention would be to stick silicone rubber pads on top of the threads and holes caused by the sewing machine when attaching a screen to a shroud. Other solutions to the tear problem include but are not limited to the aforementioned method of multi-layering layering the screen material with tear-resistant materials.

Referring now to FIGS. 4 A, B, and C, each depicts, respectively, a perspective, a side, and a top views of the main body 130 and sliding member 140 of one embodiment like those of FIGS. 1 and 2. FIG. 4 D depicts a shiny ridge or cone 136 at the end of the housing member or main body 130 that serves as a centering portion for the sliding member 140 in its most forward position for extending the screen to its extended, tensioned position. Due to mechanical tolerances, the inside of the sliding member will always have a larger circumference than the outside of the housing. To make sure that the slider is centered with respect to the housing member, the ridge works like a cone while the sliding member works like a ring—the ring is always centered when placed on top of the cone. A slot may also be seen in the side of the housing member 130 that serves as a guide for engaging with the sliding member 140. The inside of the sliding member 140 may have a slight extension or projection that fits into the slot.

In FIGS. 4, the position of sliding member (or ring-like hollow member) 140 on the main body (or partially hollow member) 130 is in the forward or fully extended operating position. Note that both members have mounting extensions (or "connectors") 132, 142 at their ends for making rotatable connections with the collapsible arms. More particularly, main body member (or housing member) 130 has four sets of extensions 132 as may best be seen in FIG. 4A. Similarly, sliding member 140 also has four sets of extensions 142 for making rotatable connections with the collapsible arms, as may best be seen in FIG. 4A. In FIG. 4A, the numeric labels for the extensions marked 142, 132 are for the lower arms and in FIGS. 4B and 4C the numeric label for the extensions marked 142, 132 are for the upper arms. Each of these arm mounting extensions 142, 132 have three panels with each panel having an opening for containing a wire or rod member to attach the ends of a folding collapsible arm in a rotatable manner to these mounting extensions. In this manner two folding collapsible arms may be joined together in a parallel but still rotatable manner, and provide more rigid, but still light weight, arms when in the fully extended operation position; an example of such a dual arm configuration is discussed later herein, with respect to FIG. 10.

In FIG. 5 B, in order to have the upper arms compensate for the weight of the screen and shroud when fully deployed, the upper arms mounting extensions 132, 142 on the main body 130 and the sliding member 140 are located at a bigger angle from the horizontal line passing through the center on the device than the angle used for the mounting extensions for the two lower arms. Note that in FIG. 5 B, the angles are labeled to make it more obvious to understand, but the 51 and 40 degree combination are only representative angle combinations and they may be any other numbers. Further, the two upper arms may be slightly longer or shorter than the two lower arms to compensate for the weight of the screen and the shroud. To compensate for gravity, different arms may also have different strength. In the embodiment of FIG. 2, the top 2 arms may be stronger than the bottom 2 arms by: 1) joining more single arms to provide the required rigidity like in FIG. 10 (e.g. each top arm has 3 single arms combined while each bottom arm only has 2 combined); 2) having more struts in the top arms such as having two 128*d* in parallel on the top arms; 3) having larger diameter in each of the upper arm's struts like 128*d* than the bottom arm; and 4) having higher stiffness in each of the top arm's struts like 128*d* than the bottom arm, etc.

Figure 4A:
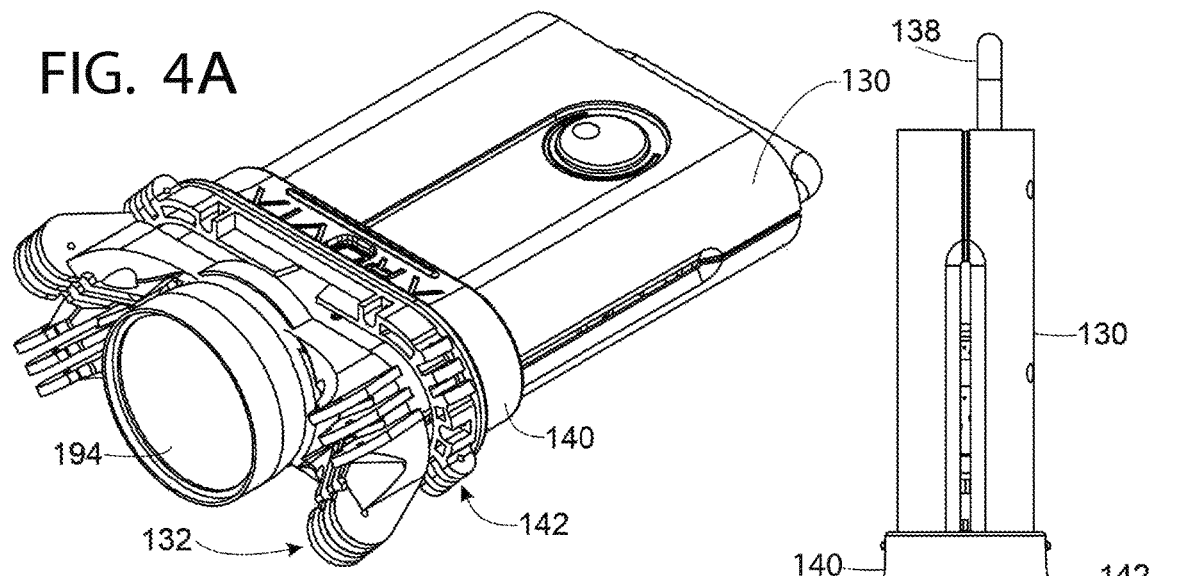
FIGS. 4 A, B, C and D depict perspective, side and top views of the main body and sliding member, and a portion of the main body of FIG. 2.
Figure 4B:
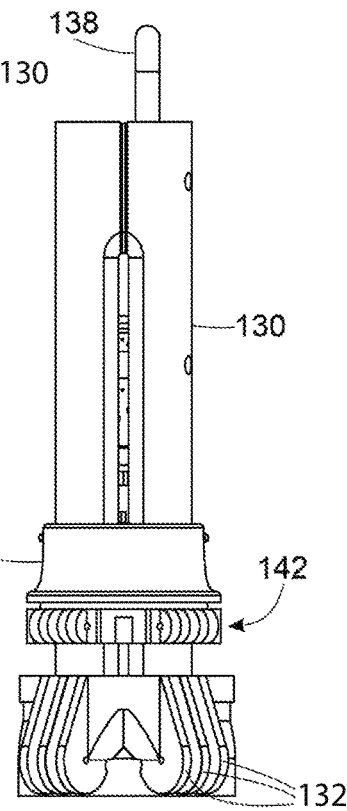
Figure 4C:
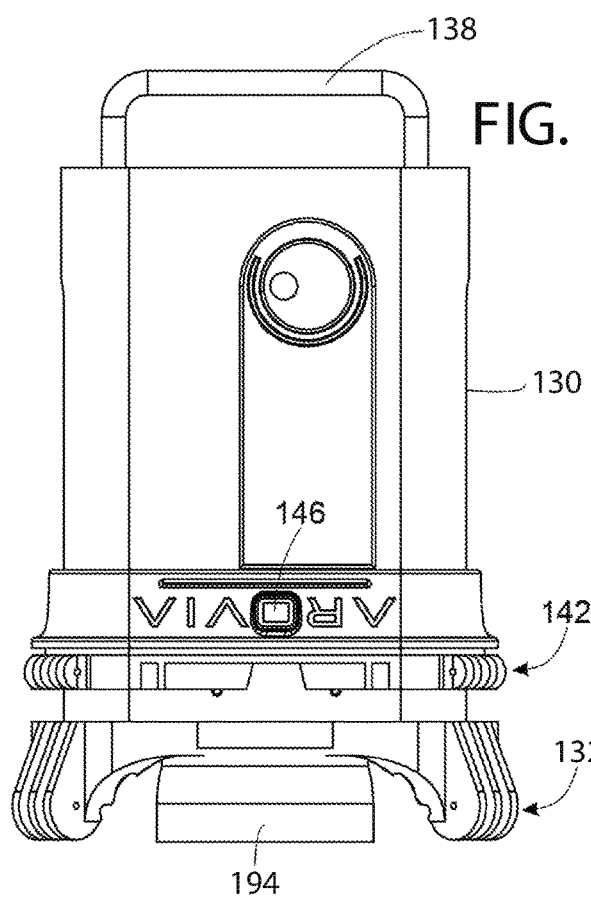
Figure 4D:
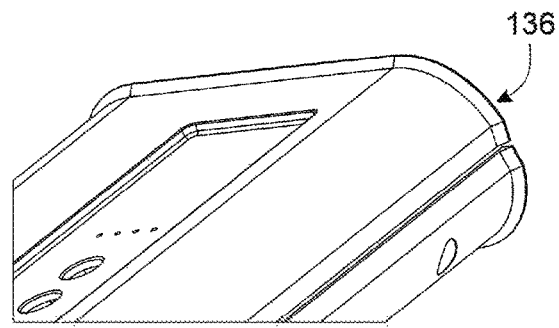

FIG. 4C illustrates an optional handle 138 on the back of the main member 130 and the push button or mechanical release 146 in the sliding member 140. This push button is depressed to allow the sliding member 140 to move towards the handle of the main member 140 to move the screen 110 (FIG. 3) to the fully collapsed position.

The housing 130 may be configured to include a projector with or without a wide angle converter lens, or another form of a collapsible screen/display, in addition to mounting the multiple folding arms, and the exterior sliding member 140. Accordingly, for some embodiments, the housing 130 may hold any type of available, small, light-weight projector and its associated lens, provide support for the folding arms 122, 124, 126, 128, and allow the sliding member 140 to slide smoothly on the exterior of housing 130. Some embodiments may employ any projector that directly projects forward and does not use or have any mirrors, but other embodiments may use mirrors. The housing 130 may also include a handle 138 at the very back of the device. The handle allows an individual to hold the device 100 while pushing the sliding member 140 forward and for conveniently carrying the device when fully collapsed.

Referring now to FIG. 5 A, there may be seen a top partially, cut away view of the internal components of the main body 130 of FIG. 4. More particularly, there may be seen a printed circuit board (PCB) 180 for containing electrical components needed to operate a projector engine 190. The projector in turn projects the image provided to it in an electronic format in a human comprehendible form for display on the screen 110. Lens assembly 192 is used to focus the image on the screen and is typically a part of the projector engine. A battery (not depicted) is also located in the main body underneath the PCB 180. The battery serves to operate the projector when other sources of power are unavailable. The battery is preferably a lithium ion battery. The projector is preferably a DLP based projector engine commercially available on the market, a LCOS projector, or a laser-based projector. For some embodiments the device may employ a camera, preferably infrared sensing, (not depicted) for viewing the screen and the position of a finger or pointer on the image, and determining the location of that pointer on the image and then transmitting that to a controller to allow for a touch screen embodiment. Other touch screen embodiments may employ capacitive touch materials, or similar materials, in or on the screen.

For some embodiments a wide angle converter lens assembly 194 is optionally positioned on the main body 130 and operatively in the front of a projector engine 190 employed with the device. The lens 194 is fixed with respect to the projector through mountings inside the main housing of body 130; more particularly, the lens 194 may removably snap into a socket or detents on the body 130 or the lens 192 of the projector 190; alternatively, the lens 194 may screw into the body 130 or screw onto lens 192. The lens 194 can shorten the throw ratio of the projector so that, in order to achieve the same screen size, the screen can now be placed closer to the projector; a wide angle lens saves table space. The projector 190 in the device 100 can either be tilted, or have an offset of the light beam to prevent the projected light beam from being cut off by a table top, when deployed for use.

Figure 6A:
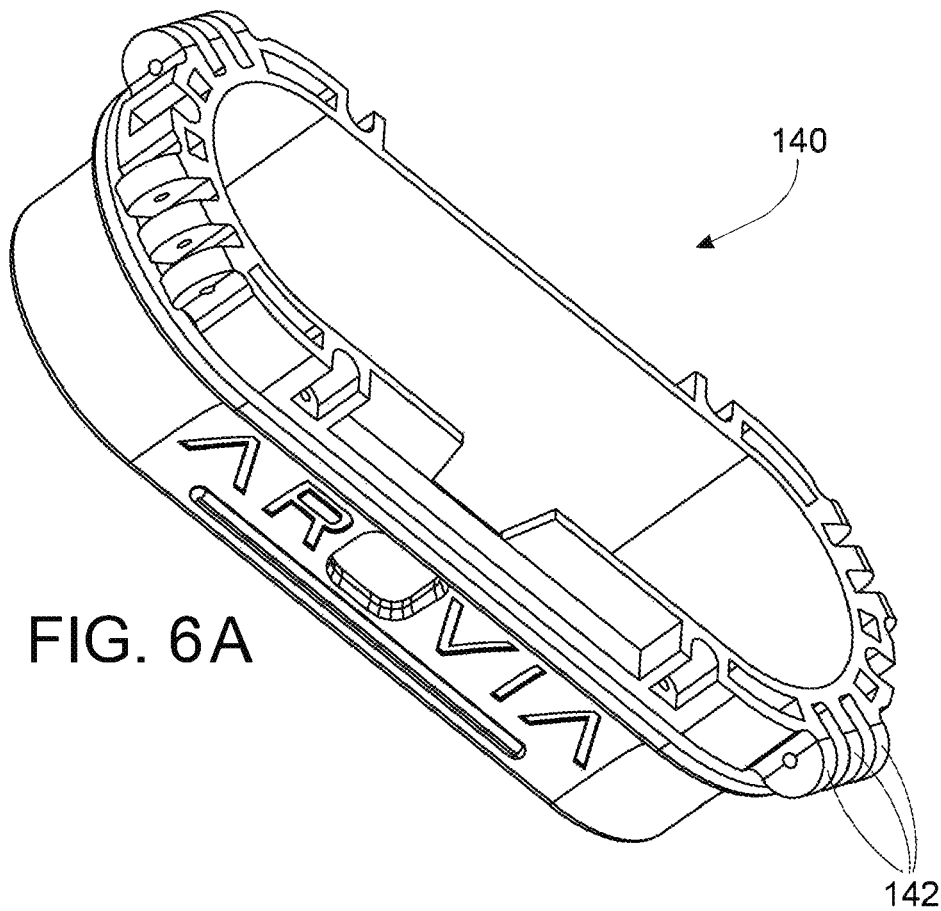
FIGS. 6 A and B depict a perspective and top view of the sliding member of FIG. 2.
Figure 6B:
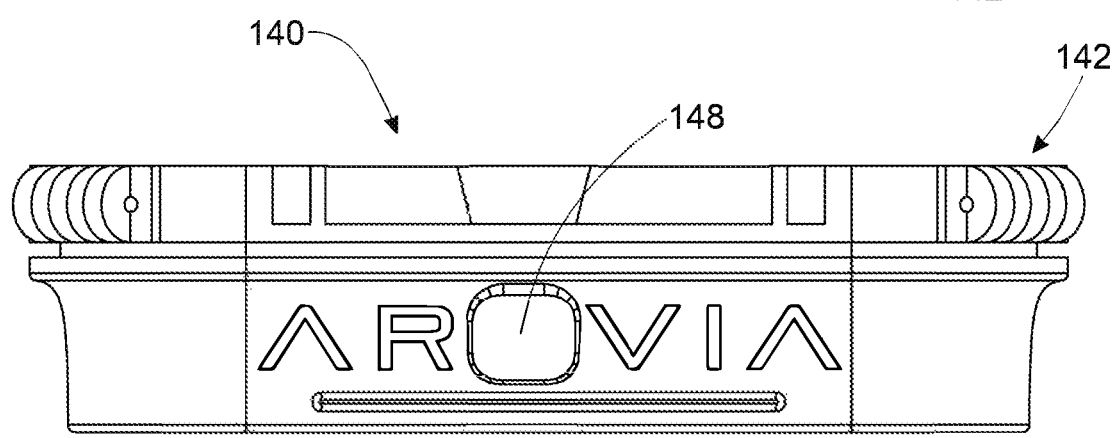

Referring now to FIGS. 6 A and B, there may be seen, respectively, a perspective and top view of the sliding member 140 of FIG. 4. More particularly, it may be seen that sliding member 140 has four sets of extensions 142 for making rotatable connections with the collapsible arms, as may best be seen in FIG. 6 A. Again, as depicted in FIG. 5 B for the main body 130, in order to have the upper arms compensate for the weight of the screen and shroud when fully deployed, the upper arms mounting extensions 132, 142 on the main body 130 and the sliding member 140 are located at a bigger angle from the perpendicular line passing through the center on the device than the angle used for the mounting extensions for the two lower arms; that is the mounting extensions for the upper arms are located closer to the center of the body as represented by the button 148, than the extensions for the lower arms. Further, the two upper arms may be slightly longer than the two lower arms to compensate for the weight of the screen and the shroud. In addition, for some embodiments a third arm may be added between the two upper arms to help hold up the shroud.

FIG. 6 B illustrates the opening in the movable member for the push button 146 that is preferably mounted on main member 130, but may alternatively be located on member 140. This push button mechanically releases sliding member 140 from the forward operating position to allow the arms and screen to be moved to the stored collapsed operating position when sliding member 140 is moved to the rear of main body 130.

Referring now to FIGS. 7 A and B, there may be seen the attachment of one of arms 126 of a prototype to the main body 130 and sliding member 140 in a rotatable manner to both the main body and the sliding member. FIG. 7A depicts the main body 130 and sliding member 140 in the forward fully extended operating position to fully extend the collapsible arm 126. FIG. 7B depicts an enlarged portion of FIG. 7A to further illustrate the rotatable connections between the extensions of the main body mounting extension member 132 and siding member mounting extension member 142 and the operative end portions of folding collapsible arm 126 members.

Continuing to refer to FIGS. 7A and B, there may be seen the details of the attachment of a portion of one of the folding collapsible arms of a prototype to the fixed housing 130 and moveable member 140. The attachment of a short strut of an arm to the sliding member 140 of the device and the attachment of a longer strut of an arm to the fixed portion of the body 130 is depicted. As may be seen in FIGS. 7, each of the struts are connected to their respective mounting extensions in a rotatable manner using openings at the end of each arm that is then held in an opening in the mounting extension of the body or moveable member for each arm. Each arm is rotatably held in place by means of a wire member or rod 132*a*, 142*a* passing through the opening at the end of each strut of an arm and the opening of the mounting extension 132 in the body 130 or the opening of the mounting extension 142 in the moveable member 140, which are each for containing the wire member 132*a*, and 142*a*, respectively.

Figure 8:
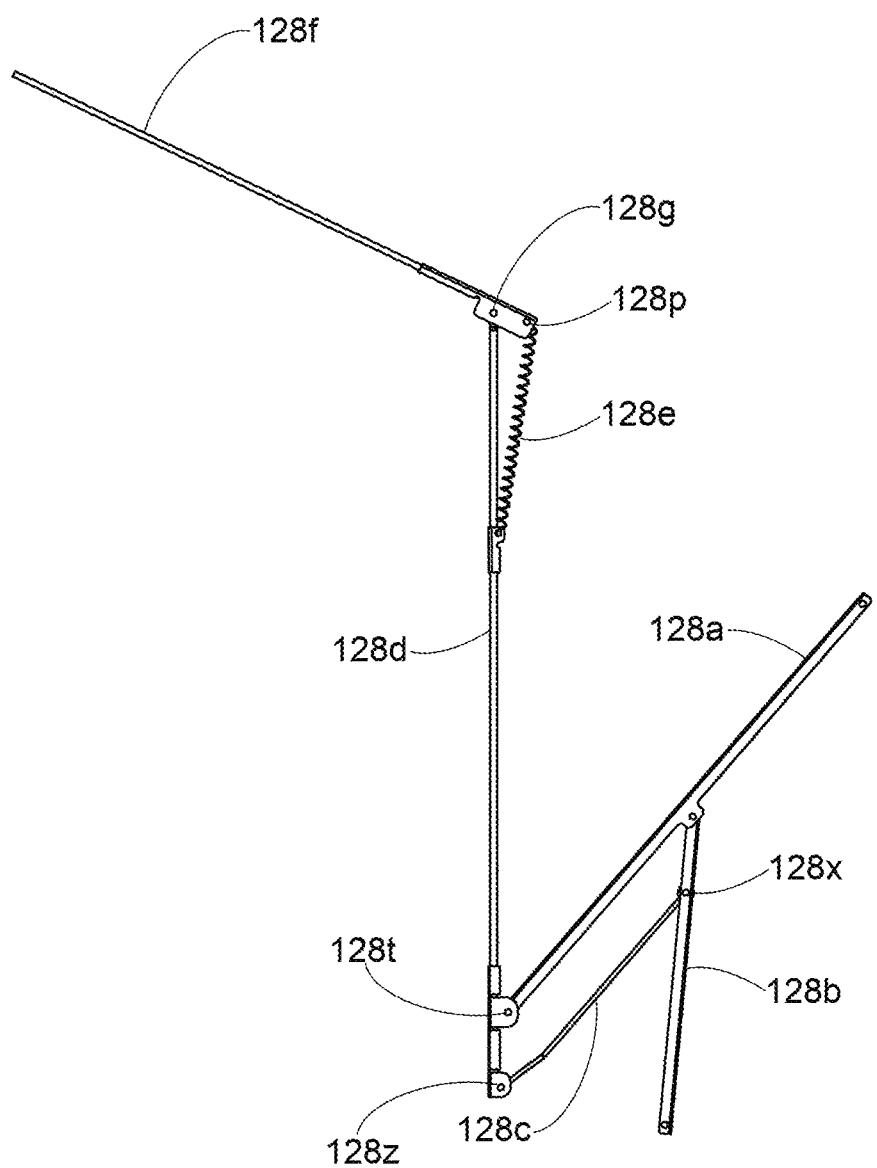
FIG. 8 depicts the details and construction of one of the folding arms of the prototype embodiment of FIG. 7 in a partially extended operating position.

Referring now to FIG. 8, there may be seen the details and construction of a representative one of the folding collapsible arms 128 in a partially extended position. In FIG. 8, there may be seen an expanded view of one of the folding arms 122, 124, 126 or 128 of the prototype of FIG. 7 in a partially extended operating position. Again, as depicted in FIGS. 7, each arm has two attachment points as described herein below.

The first attachment of each arm is a long first strut 128*a* attached in a rotatable manner to a fixed non-moving mounting extension 132 of the main body 130, as depicted in FIG. 7. The second rotatable attachment of each arm is a shorter second strut 128*b* that is connected to the first strut 128*a* in a rotatable manner approximately half way up the first strut 128*b* and is also connected to moveable sliding member 140 in a rotatable manner at mounting extension 142, that have been previously described in more detail with respect to FIGS. 7, hereinabove. Note also that the shorter second strut 128*b* has a third strut 120*c* connected to it in a rotatable manner at pivot point 128*x* and also to a fourth strut 128*d* that is connected to the first strut 128*a* in a rotatable manner at nearly one end at pivot point 128*t* and connected to the third strut 120*c* in a rotatable manner at that same end, but at pivot point 128*z*.

Continuing to refer to FIG. 8, it may be seen that each arm also has a fifth strut 128*f* connected to the fourth strut 128*d* in a rotatable manner at pivot point 128*g*, with a slight extension beyond the point of rotation 128*g*. The fifth strut 128*f* is connected in a removable manner at the other end to the screen 110 (not depicted) on one corner or edge of the screen. The fifth strut 128*f* is also attached at the extension, or non-screen, end to a spring 128*e* at pivot point 128*p*. Spring 128*e* is also connected to fourth strut 128*d* some distance down its length from the attachment to the fifth strut 128*f*. This spring connection distance is dependent upon the length of the spring in its non-tensioned state, but is depicted as approximately one third of the way down its length from the attachment to the fifth strut. Other mechanical energy storage devices may be employed in place of a spring, such as, for example, but not limited to rubber bands, pneumatic pistons, or similar devices. For some embodiments of the present disclosure, each of these arms may be an actual umbrella arm similar to the ones in commercially available umbrellas made by Paradise Umbrella (located in China) that are modified in accordance with the teachings of the present disclosure, and as discussed more fully herein with regard to FIGS. 7, 8 and 9.

Again, each of the arms 122, 124, 126 and 128 are attached to the corners of the main body and sliding member using the mounting extensions and are also attached to corresponding corners or edges of the screen 110. These umbrella arms are modified by shortening the strut that will be attached to the sliding member 140. The shortened strut allows the collapsible arms to deploy in a forward direction and more parallel to the main axis (running from the screen to the handle) of the main body 130 rather than to the side of the main body 130. And some struts of each umbrella arm are removed and replaced with a spring member.

Struts 128*a* and 128*b* are preferably u shaped and sized to allow for other strut members to nest inside the u shape when fully collapsed. Third strut 128*c* is preferably a circular wire member or rod that can retract into the u portion of the first and second struts when the struts are in the collapsed operating position. In a similar manner, the fourth strut 128*d* is a circular wire member or rod and the fifth strut 128*f* may be a circular wire member or rod. The length of the struts 128*a*, 128*d*, and 128*f* determine the distance from the screen to any projector employed in the main body 130 when the screen is popped-up or deployed in the fully extended operating position. Alternatively, the length of the main body 130 may determine the length of the struts in each arm and the screen size may determine the number of struts employed in each arm. For example, four strut segments may be employed instead of three to provide more distance to the screen and/or for a larger screen. Similarly, only two segments may be employed.

Continuing to refer to FIG. 8, there may be seen the details and construction of a representative one of the folding arms of the prototype of FIG. 7. The additional modification (besides 128*b*) to any actual umbrella arm is to add spring 128*e* and connect it to the fourth strut 128*d* some distance down its length from the attachment to the fifth strut 128*f*, and remove any other extra struts, if present. This spring connection distance is dependent upon the length of the spring in its non-tensioned state, but is depicted as approximately one third of the way down its length from the attachment to the fifth strut for the spring length depicted. Then for any actual umbrella arm, spring 128*e* is attached to the fifth strut 128*f* at the non-screen end.

Figure 9:
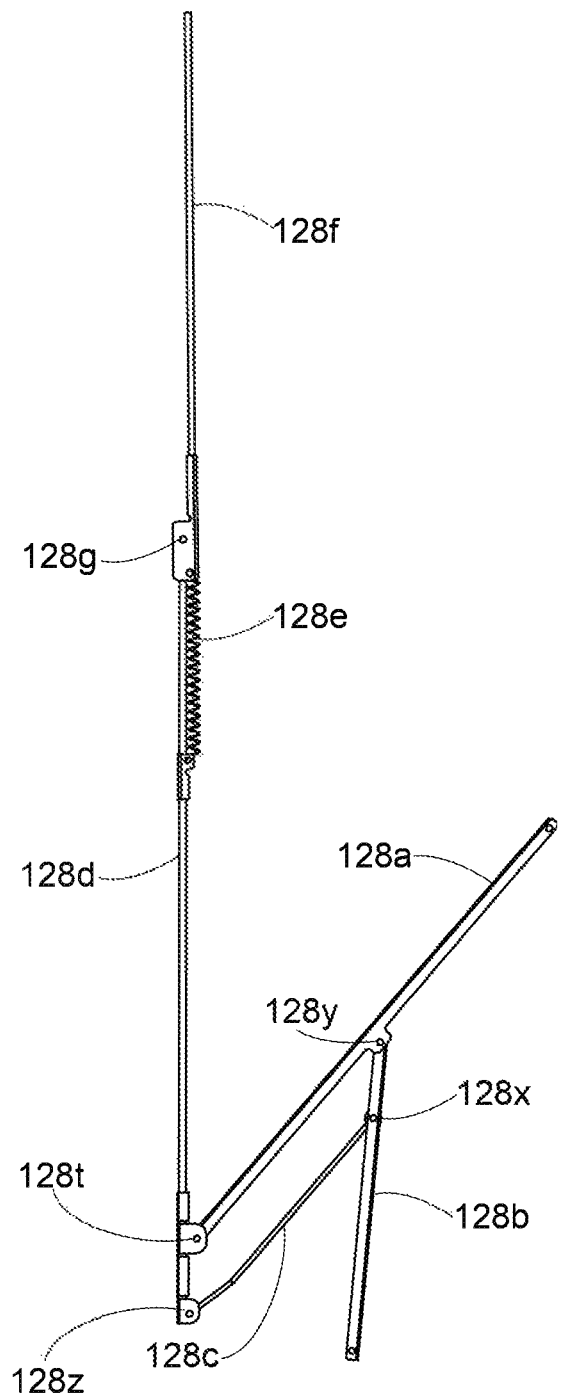
FIG. 9 depicts the details and construction of one of the folding arms of the prototype embodiment of FIG. 7 with one portion of the arm in its fully extended operating position.

Referring now to FIG. 9, a portion of a collapsible foldable arm is depicted in its fully extended operating position. More particularly, the fifth strut 128*f* is shown in the fully extended operating position as a result of the spring 128*e* returning to its shortened, non-tensioned state and its action to rotate strut 128*f* about the rotation point 128*g* to be aligned with fourth strut member 128*d*. First strut 128*a* is rotatably connected to second strut 128*b* at pivot point 128*y*. The arm struts become elastically bent or slightly curved when fully extended as the screen is resisting the tensioning of the arms because of the screen's size and elasticity. In this manner when the other remaining strut members are in the fully extended operating position (as seen in FIGS. 1 and 2) the struts are all extended and the screen 110 is popped-up or fully deployed and tensioned in the operating position.

Although the foregoing descriptions of the four arms has treated each arm as if it were composed of a single strut, each of the arms in the presently preferred embodiment is preferably made up of two sets of parallel struts, as noted in the description of FIG. 4 and its arm attachment extensions 132, 142.

Figure 10:
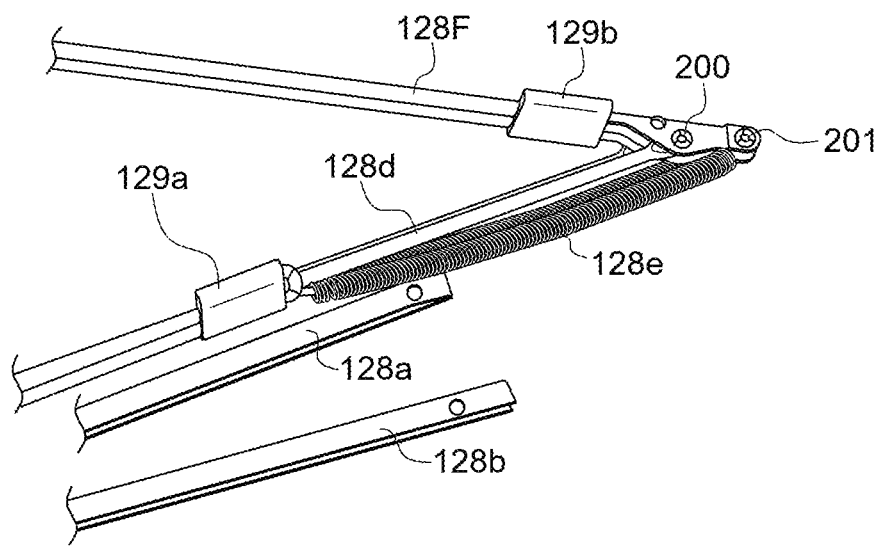
FIG. 10 depicts the details and construction of one of the folding arms of a prototype embodiment.

Referring now to FIG. 10, there may be seen the details of two sets of parallel strut arms. More particularly, it may be seen that the two arms are spaced apart by a member 129*a*, 129*b*, but connected and held together by lightweight but strong materials, like for example, but not limited to, some type of tape. The attachment of the spring members 128*e* to struts 128*f* and 128*d* is also clearly depicted. Similarly, the openings in the struts 128*a*, 128*b* for connection to the mounting extensions is clearly depicted. The rivets 200, 201 that serve as the rotation points (pivot points 128*g*, 128*p* in FIG. 8) for the arms may be removed and replaced by a single rod that passes through the openings where the rivets were in the two arm structures to provide the same point for rotation.

Figure 11:
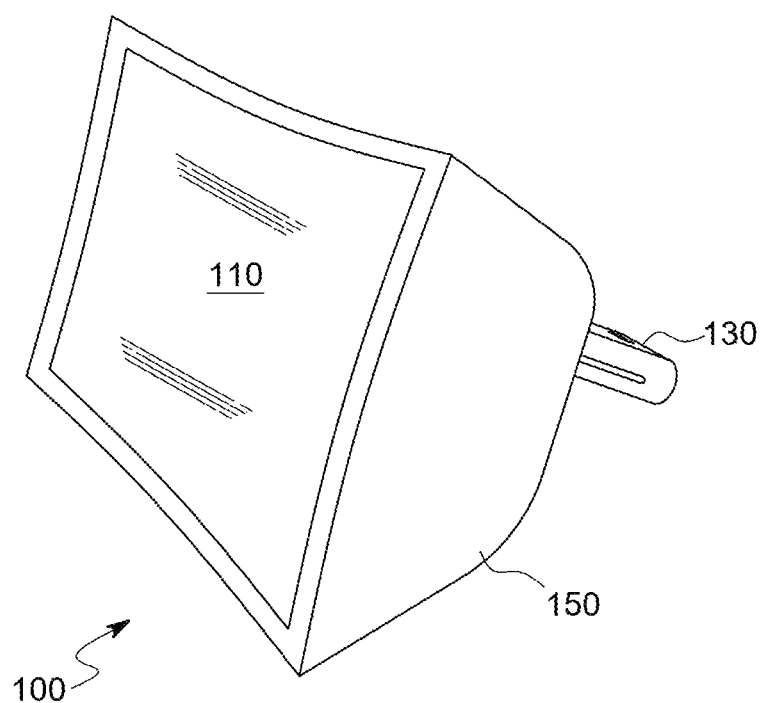
FIG. 11 depicts a side view of one embodiment of the collapsible, portable display of the present disclosure.

Referring now to FIG. 11, there may be seen an example of a prototype of the device 100 of FIGS. 1 and 2. The screen 110, shroud 150 and the main body 130 are clearly seen. The attachment of the screen to the ends of the collapsible, foldable arms is also seen. Again, each corner of the screen 110 is connected to its respective arm using a clamp (and any associated protective material) on that corner.

Figure 12A:
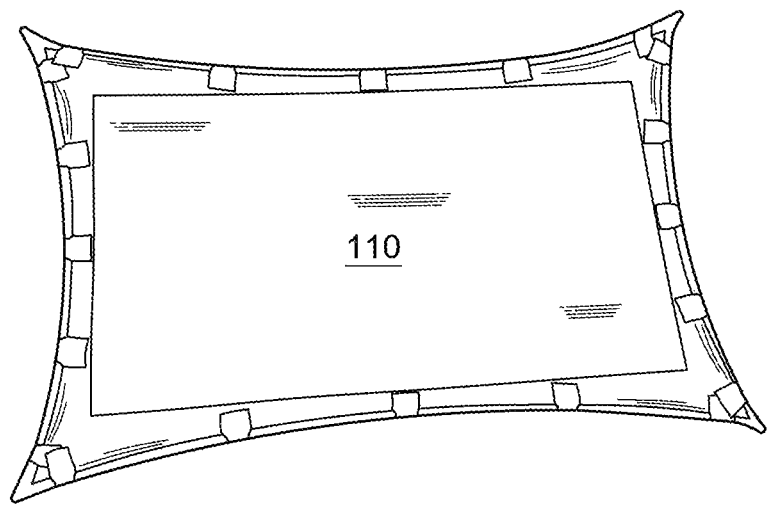
FIGS. 12 A and B depict improved screen members of a prototype embodiment.
Figure 12B:
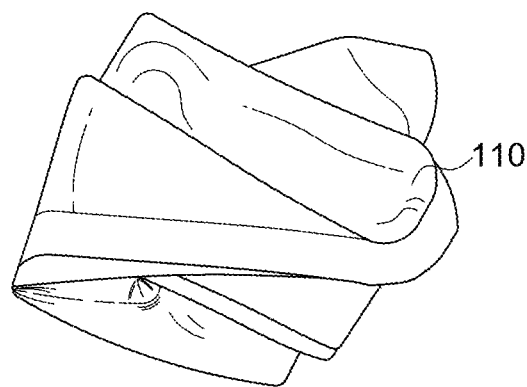

Referring now to FIGS. 12 A and B, there may be seen an example of a prototype of the screen 110, for the device 100 of FIGS. 1 and 2, in the extended and tensioned popped-up or operating position and in a collapsed position, respectively. Although the screen 110 is preferably in a rectangular form factor as depicted, other form factors, such as, but not limited to, a square may be employed. For this example, the screen and its skirt member around the edges of the screen are also seen. However, use of a skirt is optional. When used, the skirt may consist of cloth with Velcro around the outermost edges for an optional attachment to the shroud. As depicted in FIG. 12A, the screen 110 has concave edges to prevent screen wrinkling when popped-up.

Figure 13A:
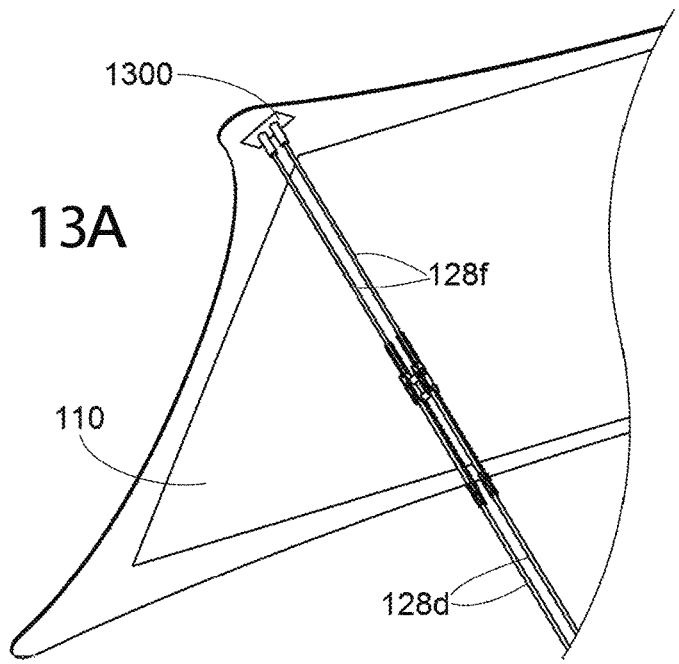
FIGS. 13 A, B, and C depict the attachment of a collapsible folding arm to the screen of a prototype embodiment.
Figure 13B:
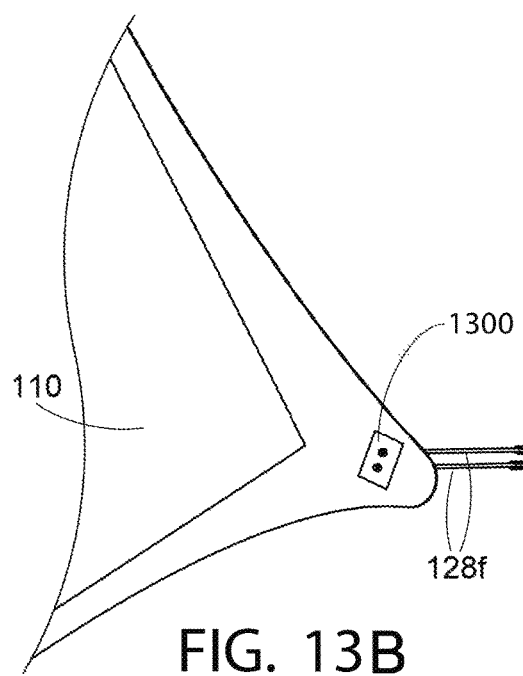
Figure 13C:
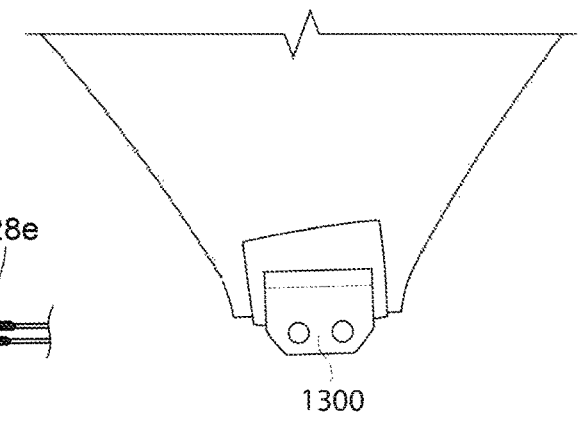

Referring now to FIGS. 13 A and B, there may be seen an example of a prototype of the screen 110 and its attachment to the ends of a collapsible foldable arm from the front and back of the screen, respectively. The screen or its skirt has clamp and anchor members 1300 attached to it with openings for the arms. These clamp and anchor members are depicted in FIG. 13 C and disperse the stress from deployment and tensioning to prevent the screen from tearing at the points of arm connection, and are preferably metallic clamps using protective cushion layers, which cushion layers are compressed between the screen and the clamp as depicted in the figure below. As noted earlier herein, this cushion material may be a layer of polyurethane or a similar soft material.

The screen folds neatly into a collapsed state. However, the screen 110 when in a collapsed position, along with the collapsed shroud, is used to grip struts 128f so that a user can fold back struts 128f to lay on top of the remainder of the struts 128d and tension spring member 128e when the device is to be placed in the fully collapsed operating position. Then protective cover 160 is secured around the screen and the collapsible foldable arms in their collapsed operating position.

Figure 14A:
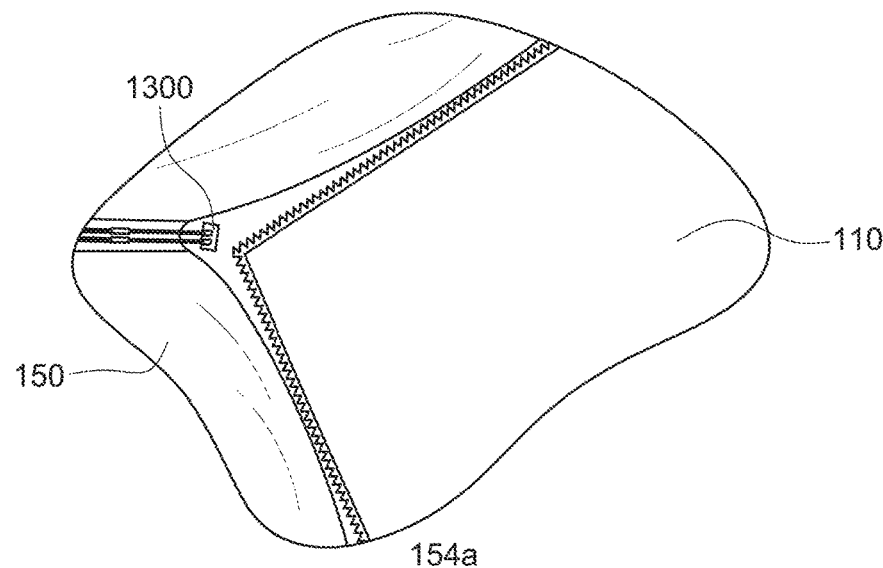
FIGS. 14 A, B, and C depict the improved attachment of the screen to the shroud of a prototype embodiment.
Figure 14B:
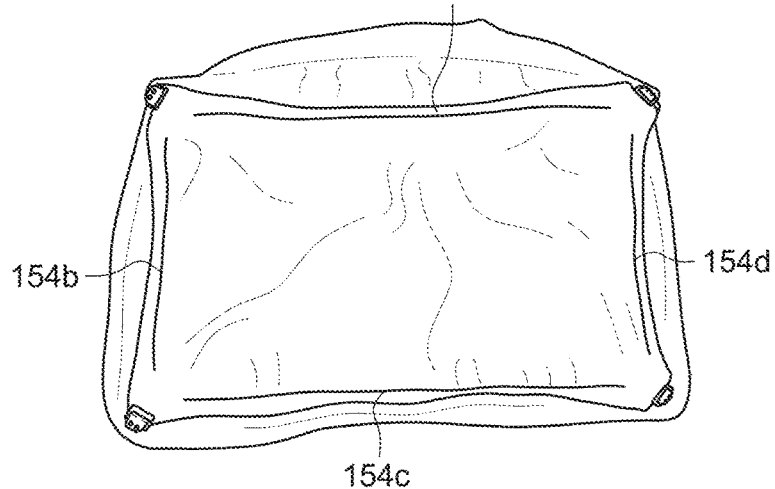
Figure 14C:
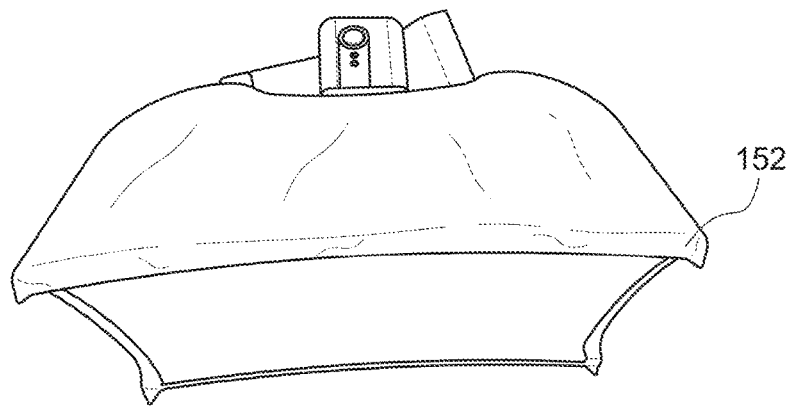

Referring now to FIG. 14 A, there may be seen an example of a prototype of the screen 110 in the fully extended popped-up or operating position depicting its attachment to the shroud member 150. For the embodiment depicted in FIG. 14 A, the screen is depicted as sewn to the shroud. Again, as noted herein before, Velcro or other similar materials may be employed to attach the screen to the shroud. FIG. 14 B shows a shroud embodiment that is inside-out. For the embodiment depicted in FIG. 14 B, the sewing trace that connects the shroud to the screen stops short at the four corners of the screen. Instead of connecting the sewing traces into a closed rectangular, the traces in 14 B are 4 discrete lines 154a, 154b, 154c, and 154d, not connected at the corners. The sewing traces are not joined at the corners of the screen because when the screen is tensioned at the four corners, the most extreme deformation happens across the two diagonals of the screen, passing through the four corners. Sewing at the corners would alter the natural stress distribution across the sheet of screen material, possibly creating stress lines and creases across the otherwise flat screen and deforming the projected image. Sewing at corners is also more technically challenging than sewing a straight line, and could potentially lower the yield rate during mass production. Because the shroud is not sewn to the screen at the four corners, and the arms are preferably attached to the screen directly, the 4 corners of the shroud have the risk of hanging loose and affecting aesthetics. To prevent the fabric at the corners from hanging loose, the shroud may at least be partially attached to the arms at the corners using plastic clothing label strings, threads, or any other connection methods inserted through the edge of the shroud and openings in the arms for these strings. Further, the shroud may have extra material at each of its corners to form a triangular pocket 152, as depicted in FIG. 14 C. The triangular pocket prevents the otherwise flat screen from being pulled and slightly deformed by the possible tight shroud fabric caused by sewing errors at the corner of the shroud, which in turn may deform the image; this further distributes any stress more evenly across the screen/center viewing area. FIG. 14 B depicts screen corners not sewn to the fabric of the shroud and FIG. 14 C depicts corners of the screen and shroud attachments been pointy.

Although the embodiments depicted and described herein have employed three strut segments for each arm, the arms may employ more or less than this number of strut segments. If a larger screen size is needed then four or more strut segments, or a telescoping arm segment as the final segment may be employed to enable the last strut segment to be extended when desired and collapsed into the arm strut when the arm is collapsed. If a smaller screen size is desired, then possibly only two strut segments may be employed. The number of strut segments may be selected depending on the main body size and the screen size. The length of the main body may determine the strut lengths and the screen size may determine the number of strut segments needed. In addition, considerations of the projector engine size, the battery size, the size of the optics employed and the PCB size may also affect the body size; and in some cases the distance the sliding member needs to travel on the body may have an impact of the body size. In addition, some embodiments may not employ segmented collapsible arms, but other types of collapsible arms may be employed, such as for example, but not limited to, telescoping arms.

Accordingly, a presently preferred embodiment is a collapsible, portable display device, having a housing member having a sliding member aligned on the exterior of said housing and sliding along the exterior of said housing between two operating positions, a collapsible screen capable of displaying an image, and multiple collapsible members connected to said screen and connected to both said sliding member and said housing member, for moving said screen between a first position and a second position.

For a currently presently preferred prototype embodiment the body is approximately 4⅓ inches wide, 7½ inches long, and 2¹/₁₀ inches thick and employs two lithium ion cells in series for the battery to obtain approximately 7 volts. The longest strut of an arm for this embodiment is approximately 150 mm.

Accordingly, it may be seen that the present disclosure provides a display device, having a first at least partially hollow member having a first set of attachment points, a second ring-like hollow member mounted on the exterior of said first hollow member and sliding along the exterior of said first hollow member between two operating positions and having a second set of attachment points, a first set of collapsible arms, each of which arm contains a plurality of multiple interconnected and segmented members and each of which arm is respectively connected to one of said first attachment points, a second set of arms, each of which are respectively connected to one of said second attachment points, a third set of arms each of which are respectively and operatively interconnected with one of said second set of arms and an associated one of said segmented members of said first set of collapsible arms, a screen capable of displaying an image and operatively and removably connected to one respective member of said segmented members of said first set of collapsible arms at each corner, and wherein said first, second and third set of arms are operative to move said screen between a position for display and a collapsed position responsive to the position of said sliding second hollow member on said first hollow member.

While the present disclosure has been described with respect to the embodiments set forth above, the present disclosure is not necessarily limited to these embodiments. Accordingly, other embodiments, variations, and improvements not described herein are not excluded from the scope of the present disclosure. Such variations include but are not limited to new screen material, new screen particulate material, new lenses and/or mirrors, and new projectors.

Although the present disclosure and its advantages have been described in detail, it should be understood that various changes, substitutions and alterations can be made herein without departing from the spirit and scope of the disclosure as defined by the appended claims.

The invention claimed is:

1. A display device, comprising:
a first at least partially hollow member having a first set of attachment points,
a second ring-like hollow member mounted on the exterior of said first hollow member and sliding along the exterior of said first hollow member between two operating positions and having a second set of attachment points,
a first set of collapsible arms, each of which arm contains a plurality of multiple interconnected and segmented members, and each of which arm is respectively connected to one of said first attachment points,
a second set of arms, each of which are respectively connected to one of said second attachment points,
a third set of arms each of which are respectively and operatively interconnected with one of said second set of arms and an associated one of said segmented members of said first set of collapsible arms,
a screen capable of displaying an image and operatively and removably connected to one respective member of said segmented members of said first set of collapsible arms at each corner, and
a plurality of anchor members clamped onto said screen to serve as the connection medium between said screen and external tensioning components,
wherein said first hollow member has an exterior alignment cone for said second hollow member when located in one of said operating positions.

2. The device of claim 1, further comprising:
said first hollow member has an opening for containing a portable projector.

3. The device of claim 2, wherein said first hollow member is configured to contain a wide angle converter lens.

4. The device of claim 1, further comprising:
a flexible, wrinkle-resistant shroud that connects to said screen, except at each of the corners of said screen, and connects to said first hollow member.

5. The device of claim 4, wherein said shroud has excess fabric material at each of the corners to prevent said shroud from pulling and deforming said screen.

6. The device of claim 5, further comprising:
a shroud member detachably connected to said housing member and detachably connected to said screen member.

7. The device of claim 1, wherein each of said first set of collapsible arms is operatively interconnected for collapsing and extending as a function of the position of said second hollow member on said first hollow member.

8. The device of claim 1, wherein said screen is configured to be a touch screen.

9. The device of claim 1, wherein said screen is composed of at least one flexible, wrinkle resistant rubber material containing particulates embedded in a pattern.

10. The device of claim 1, wherein said screen is composed of at least one flexible material containing embedded particulates in a pattern and having concave edges.

11. The device of claim 1, wherein said screen further contains multiple sheets of optical enhancing or mechanical strengthening layers, with at least one layer being silicone rubber or other rubber materials for wrinkle resistance property.

12. The device of claim 1, wherein said first, second and third sets of arms are operative to move said screen between a position for display and a collapsed position responsive to the position of said sliding hollow member on aid first hollow member.

13. A display device, comprising:
a first at least partially hollow member having a first set of attachment points, a second ring-like hollow member mounted on the exterior of said first hollow member and sliding along the exterior of said first hollow member between two operating positions and having a second set of attachment points,
a first set of collapsible arms, each of which arm contains a plurality of multiple interconnected and segmented members, and each of which arm is respectively connected to one of said first attachment points,
a second set of arms, each of which are respectively connected to one of said second attachment points,
a third set of arms each of which are respectively and operatively interconnected with one of said second set of arms and an associated one of said segmented members of said first set of collapsible arms,
a screen capable of displaying an image and operatively and removably connected to one respective member of said segmented members of said first set of collapsible arms at each corner,
a plurality of anchor members clamped onto said screen to serve as the connection medium between said screen and external tensioning components, and
at least one cushion material between the anchor members and said screen to prevent said anchor member from damaging said screen.

14. The device of claim 13, wherein each of said first hollow members, said sliding second ring-like hollow member, and said collapsible arms have a mechanical adjustment structure for minor adjustment of the arms, to allow for minor adjustment of the location of the image on said screen relative to the first hollow member.

15. The device of claim 13, wherein said screen comprises at least one layer of elastic or flexible material containing at least one optical enhancing component, and an elastic or flexible material with surface microstructures to improve optical clarity.

16. The device of claim 15, wherein said screen comprises at least one layer of elastic or flexible material further contains said optical enhancing component which has a different index of refraction from that of said screen material.

17. The device of claim 15, wherein said screen further contains at least one sheet of at least one of optical enhancing and mechanical strengthening layers with at least one layer being silicone rubber or rubber materials.

18. The device of claim 15, wherein said optical enhancing component comprises at least one of small titanium dioxide particles, small metal particles, or compound particles with a different index of refraction than other screen materials, wherein such particles having a color, dyes, or colored paste, Fresnel lens(es), polarizers, micro-lenses, light absorbing micro-structures, light dispersing particles or coatings, and optical processing or enhancing components.

19. The screen of claim 15, comprising:
an elastic or flexible material with surface microstructures to improve optical clarity.

20. The screen of claim 15, wherein said surface microstructures include Fresnel lens(es), polarizers, micro-lenses, light absorbing micro-structures, light dispersing particles or coatings, and optical processing or enhancing components.

21. The screen of claim 15, wherein said screen also includes at least one of small titanium dioxide particles, small metal particles, or compound particles with an index of refraction different from at least one layer of elastic or flexible materials, any or more of such particles contain a color, dyes, or colored paste.

* * * * *